United States Patent [19]

Campbell, Jr.

[11] Patent Number: 5,206,197
[45] Date of Patent: Apr. 27, 1993

[54] CATALYST COMPOSITION FOR PREPARATION OF SYNDIOTACTIC VINYL AROMATIC POLYMERS

[75] Inventor: Richard E. Campbell, Jr., Midland, Mich.

[73] Assignees: The Dow Chemical Company, Midland, Mich.; Idemitsu Kosan Co., Ltd., Tokyo, Japan

[21] Appl. No.: 664,699

[22] Filed: Mar. 4, 1991

[51] Int. Cl.$^5$ .............................................. C08F 4/64
[52] U.S. Cl. ................................. 502/103; 502/117; 502/102; 502/113
[58] Field of Search ................ 502/102, 103, 113, 117

[56] References Cited

U.S. PATENT DOCUMENTS

| | | | |
|---|---|---|---|
| 5,036,034 | 7/1991 | Ewen | 502/103 X |
| 5,064,802 | 11/1991 | Stevens et al. | 502/117 X |
| 5,066,741 | 11/1991 | Campbell | 502/117 X |
| 5,153,157 | 10/1992 | Hlatky et al. | 502/117 |

FOREIGN PATENT DOCUMENTS

| | | | |
|---|---|---|---|
| 277004 | 8/1988 | European Pat. Off. | 502/103 |
| WO88/10275 | 12/1988 | PCT Int'l Appl. | 502/103 |

OTHER PUBLICATIONS

JACS, 1986, 108, pp. 1718–1719 and 7410–7411.
Macromolecules 1989, 22, pp. 2186–2189.

*Primary Examiner*—Patrick P. Garvin

[57] ABSTRACT

A catalyst composition for preparation of polymers of vinyl aromatic monomers having high syndiotacticity comprising a cationic coordination complex and a metal hydrocarbyl.

6 Claims, No Drawings

CATALYST COMPOSITION FOR PREPARATION OF SYNDIOTACTIC VINYL AROMATIC POLYMERS

The present invention relates to a catalyst composition for polymerizing vinyl aromatic monomers, such as styrene, to produce polymers having a high degree of syndiotacticity. Such polymers may be usefully employed in the preparation of solid objects and articles such as a moldings, films, sheets and foamed objects by molding, casting or the like processes.

In U.S. Pat. No. 4,680,353 there is disclosed a process for the preparation of polymers of vinyl aromatic monomers having a stereoregular structure of high syndiotacticity by the use of certain coordination catalysts. Particularly disclosed were the reaction products of a titanium compound and an organoaluminum compound, especially polymethylaluminoxane. The process disclosed in this patent, however, requires the use of large amounts of the polymethylaluminoxane which is very expensive and difficult to make due to its very complex structure. Also, this process requires an expensive polymer purification system to remove remaining catalyst components due to the use of large amounts of the polymethylaluminoxane.

In EP 277,004 there are disclosed certain bis(cyclopentadienyl) metal compounds formed by reacting a bis(cyclopentadienyl) metal complex with salts of Bronsted acids containing a non-coordinating compatible anion. The reference discloses the fact that such complexes are usefully employed as catalysts in the polymerization of olefins.

In U.S. Ser. No. 559,475, filed Jul. 30, 1990 and now U.S. Pat. No. 5,066,741, there is disclosed a process for preparing polymers of vinyl aromatic monomers having a high stereoregularity using certain metal complex cationic compounds. For the teachings contained therein the foregoing pending United States patent application is hereby incorporated by reference.

It has now been discovered that further improvement in catalytic properties are obtained if the cationic catalysts disclosed in the foregoing U.S. patent application Ser. No. 559,475, now U.S. Pat. No. 5,066,741, are combined with small quantities of a metal alkyl prior to contacting with styrene monomer.

According to the present invention there is now provided a catalyst composition useful for preparing polymers of vinyl aromatic monomers having high stereoregularity comprising:
1) a metal complex of the formula:

$$[Cp_mMX_nX'_p]^+A^-$$

wherein:
Cp is a single $\eta^5$-cyclopentadienyl group or a $\eta^5$-substituted cyclopentadienyl group which may optionally also be bonded to M through a substitutent;
M is a metal of Group 3, 4, 5, 6, 8, 9, 10 or the Lanthanide Series of the Periodic Table;
each X independently is an inert anionic ligand or a group of formula R, with the proviso that at least one X is R;
X' is an inert, neutral donor ligand;
each R independently is R' or hydride, wherein R' is hydrocarbyl, silyl or a mixture thereof, optionally substituted with one or more halogen atoms or alkoxy groups, and having up to 20 carbon and/or silicon atoms;
m and p are independently 0 or 1;
n is an integer greater than or equal to 1; and
the sum of m and n is one less than the valence of M, or when Cp is optionally bonded to M through a substituent, the sum of m and n is two less than the valence of M; and
$A^-$ is a noncoordinating, compatible anion of a Bronsted acid salt; and
2) a metal hydrocarbyl, the molar ratio of the metal complex: metal hydrocarbyl being 1:1 to 1:1000;
said metal complex and metal hydrocarbyl being combined prior to contacting of the metal complex with a vinyl aromatic monomer.

As used herein, the term "high stereoregularity" refers to polymers having a stereoregular structure of greater than 50 percent syndiotactic of a racemic triad, preferably greater that 75 percent as determined by $C^{13}$ nuclear magnetic resonance spectroscopy. Such polymers may be usefully employed in the preparation of articles and objects (e.g., via compression molding, injection molding or other suitable technique) having an extremely high resistance to deformation due to the effects of temperature.

Examples of R' include aralkyl, alkaryl, haloalkyl, silylalkyl, haloalkyl, haloaryl, haloalkaryl, halosilyl, haloalkarylsilyl, alkoxyalkyl, and so forth.

The term "inert" means noninterfering with the desired catalyst preparation or with the use of the resulting catalyst composition as a polymerization catalyst.

Illustrative but nonlimiting examples of X include R, halo, $NR'_2$, $PR'_2$, $OR'$, $SR'$, $BR'_2$, etc.

Illustrative but nonlimiting examples of X' include $R'OR'$, $R'SR'$, $NR'_3$, $PR'_3$, $C_{2-20}$ olefin or diolefins, etc. Such donor ligands are able to form shared electron bonds but not a formal covalent bond.

The ingredients of the metal complexes used in the present invention are prepared by combining at least two components as hereinafter disclosed. The first component is a derivative of a metal of Group 3, 4, 5, 6, 8, 9, 10 or the Lanthanide Series of the Periodic Table of the Elements containing at least one substituent which will combine with the cation of a second component (described hereinafter) or alternatively which is subject to oxidative activation as hereinafter described. The first component additionally must be capable of forming a cation formally having a coordination number that is one less than its valence. The second component is a salt of a Bronsted acid and a noncoordinating compatible anion or alternatively a salt of an oxidizing cation and a noncoordinating, compatible anion.

All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

As used herein, the recitation "noncoordinating, compatible anion" means an anion which either does not coordinate with the first component or a derivative thereof; or which is only weakly coordinated to said component thereby remaining sufficiently labile to be displaced by the vinyl aromatic monomer to be polymerized. The recitation "noncoordinating, compatible anion" specifically refers to an anion which when functioning as a charge balancing anion in the catalyst system of this invention does not transfer an anionic substituent or fragment thereof to the cationic portion of the catalyst. Compatible anions are also anions which are not degraded to neutrality under the reaction conditions of the present invention.

Preferred cyclopentadienyl and substituted cyclopentadienyl groups for use according to the present invention are depicted by the formula:

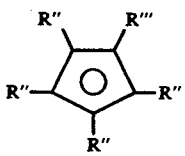

wherein:

each R" independently is hydrogen, halogen, R', N—R'$_2$, P—R'$_2$; OR'; SR' or BR'$_2$, wherein R' is as previously defined; and R''' is a group of the formula R" as defined above or a divalent group of from 2 to 7 nonhydrogen atoms that is covalently bonded to M.

Preferably, R" is alkyl or haloalkyl of up to 6 carbons, and preferably R''' is alkyl, haloalkyl of up to 6 carbons, or C$_{2-5}$ oxyalkylene or alkylene.

Illustrative, but not limiting examples of metal derivatives (first components) which may be used in the preparation of the metal complexes used in this invention are derivatives of titanium, zirconium, hafnium, chromium, lanthanum, etc. More preferably such metal derivative compounds are those having X, R" and R''' substituents that are either devoid of reactive hydrogens or wherein potentially reactive hydrogens are protected by bulky protecting groups.

Illustrative, but not limiting examples of suitable metal derivative compounds include: tetranorbornenyl titanium, tetrabenzyl zirconium, tetraneopentyl titanium, (cyclopentadienyl)dimethyl(isopropoxy)titanium, (cyclopentadienyl)dibenzyl(isopropoxy)titanium, (cyclopentadienyl)dibenzyl(phenoxy)zirconium, (cyclopentadienyl)dibenzyl(isopropoxy)hafnium, (cyclopentadienyl)dimethylzirconium chloride, (cyclopentadienyl)methylyitrium chloride, bis(phenoxy)di(trimethylsilyl)zirconium, phenoxytrimethylzirconium, bis(2,6-diisopropyl-4-methyl)phenoxy)dibenzyltitanium, bis(2,4,6-trimethylphenoxy)dibenzyltitanium, tri(tertiary butyl)siloxytrimethyl zirconium, bismethoxydi(phenylmethyl)titanium, bis(2,4,6-trimethylphenoxy) dibenzyltitanium, triphenoxybenzyltitanium, bis(2,4,6-trimethylphenoxy)propylscandium, butoxytris((trimethylsilyl)methyl)zirconium, dimethoxydimethylzirconium, 4-(1-methyl-1-(4-methoxyphenyl)ethyl)-phenoxy tribenzyl titanium, dinorborneyldichlorotitanium, tribenzyltitanium hydride, cyclopentadienyltribenzylzirconium, cyclopentadienyltribenzyltitanium, cyclopentadienyltrimethyltitanium, cyclopentadienyltrimethylzirconium, cyclopentadienyltrineopentyltitanium, cyclopentadienyltri(diphenylmethyl)zirconium, cyclopentadienyltriphenylzirconium, cyclopentadienyltrineopentylzirconium, cyclopentadienyldi(m-tolyl)zirconium, cyclopentadienyldi(p-tolyl)zirconium, cyclopentadienyltrimethyltitanium hydride, cyclopentadienyltridiphenylmethylzirconium, and the like; hydrocarbyl-substituted cyclopentadienyl compounds such as pentamethylcyclopentadienyltrimethylzirconium, ethylcyclopentadienyltrimethylzirconium, pentamethylcyclopentadienyltribenzylzirconium, n-butylcyclopentadienyltrineopentyltitanium, (t-butylcyclopentadienyl)tri(trimethylsilyl)zirconium, cyclohexylcyclopentadienyldimethylzirconium, (pentamethylcyclopentadienyl)dimethylzirconium chloride, indenyldibenzyltitanium chloride, (pentamethylcyclopentadienyl)diisopropoxyhafnium chloride, (benzylcyclopentadienyl)di(m-tolyl) titanium chloride, (diphenylcyclopentadienyl)dinorborneylzirconium chloride, methylcyclopentadienyltriphenylzirconium, tetraethylcyclopentadienyltribenzylzirconium, propylcyclopentadienyltrimethylzirconium, propylcyclopentadienyltrimethylzirconium, (n-butylcyclopentadienyl) dimethyl(n-butoxy)titanium, cyclopentadienyldiphenylisopropoxyzirconium, cyclohexylmethylcyclopentadienyltribenzylzirconium, cyclohexylmethylcyclopentadienyltrimethylzirconium, cyclopentadienylzirconium dihydride, benzylcyclopentadienyldimethylhafnium, indenyltribenzylzirconium, trimethylsilylcyclopentadienyltrimethylzirconium, trimethylgermylcyclopentadienyl)trimethyltitanium, trimethylstannylcyclopentadienyltribenzylzirconium, (pentatrimethylsilyl)cyclopentadienyltrimethylzirconium, trimethylsilylcyclopentadienyltrimethylzirconium, penta(trimethylsilyl)cyclopentadienyltribenzyltitanium, trimethylgermylcyclopentadienyltriphenylhafnium, cyclopentadienylbis(p-tolyl)scandium, cyclopentadienyldibenzylchromium, pentamethylcyclopentadienylbis(trimethylsilylmethyl)yitrium, pentamethylcyclopentadienylbis(trimethylsilylmethyl)scandium, pentamethylcyclopentadienylbis(trimethylsilyl)lanthanum, and the like; halogen-substituted cyclopentadienyl compounds such as trifluoromethylcyclopentadienyltrimethylzirconium, trifluoromethylcyclopentadienyltrinorborneylzirconium, trifluoromethylcyclopentadienyltribenzylzirconium, and the like; silyl-substituted (cyclopentadienyl)metal compounds such as cyclopentadienyltrimethylsilylzirconium, cyclopentadienyltri(phenyldimethylsilyl)zirconium, and the like.

Other compounds which are useful in the metal complexes, especially compounds containing other Group 3, 4, 5, 6, 8, 9, 10 or Lanthanide metals, will, of course, be apparent to those skilled in the art.

Most preferred are C$_{1-7}$ alkyl- or aralkyltitanium or zirconium compounds.

Compounds useful as a second component in the preparation of the metal complexes used in this invention may, in one embodiment, comprise a cation, which is a Bronsted acid capable of donating a proton, and a compatible, noncoordinating anion. In another embodiment such compounds comprise an oxidizing cation and a compatible, noncoordinating anion. Preferred anions are those containing a single coordination complex comprising a charge-bearing metal or metalloid core which anion is relatively large (bulky), capable of stabilizing the active catalyst species (the Group 3, 4, 5, 6, 8, 9, 10 or Lanthanide Series cation) formed when the two components are combined, and which will be sufficiently labile to be displaced by the polymerizable vinyl aromatic monomer.

The term "metalloid", as used herein, includes nonmetals such as boron, phosphorus, silicon and the like which exhibit semi-metallic characteristics. Suitable metals, include, but are not limited to, aluminum, gold, platinum and the like. Compounds containing anions which comprise coordination complexes containing a single metal or metalloid atom are, of course, well known. In light of this, salts containing anions comprising a coordination complex containing a single boron atom are preferred.

Preferably, second components useful in the preparation of the metal complexes used in this invention may be represented by the following general formulas:

$$(L-H)^+[A]^- \quad (I)$$

$$\text{or } Ox^+[A^*]^- \quad (II)$$

wherein:
L is a neutral Lewis base;
(L—H)+ is a Bronsted acid;
[A]− is a compatible, noncoordinating anion;
Ox+ is an organic or metallic oxidizing cation; and
[A*]− is a compatible, noncoordinating, inert, anion.

By the term "inert" as employed above is meant that A* of formula (II) comprises an anion which is a single coordination complex comprising a plurality of lipophilic radicals covalently coordinated to and shielding a central formally charge-bearing metal or metalloid atom, which anion is bulky and stable under the oxidation and subsequent polymerization conditions, and which anion is compatible with and noncoordinating towards the resulting polymerization catalyst. The anion is employed only to provide charge balance without interfering with the oxidizing ability of Ox+.

Anions comprising boron which are particularly useful as [A*]− may be represented by the following general formula:

$$[BX_1X_2X_3X_4]^-$$

wherein:
B is boron in a valence state of 3;
$X_1$ to $X_4$ are the same or different nonreactive, organyl or silyl radicals containing from 1 to 20 carbon or silicon atoms. In addition two or more of $X_1$ to $X_4$ may be linked to each other through a stable bridging group. Preferably $X_1$ to $X_4$ lack reactive hydrogen moieties. That is, the radicals are either devoid of hydrogen, contain only hydrogen in nonactivated positions or contain sufficient steric hinderence to protect potentially active hydrogen sites. Examples of suitable radicals for $X_1$ to $X_4$ are perfluorinated hydrocarbyl radicals containing from 1 to 20 carbon atoms, 3,4,5-trifluorophenyl, 3,4-di(trifluoromethyl)phenyl, etc.

A most highly preferred compatible, non-coordinating, inert, anion for use in compounds corresponding to formula (II) is tetra(pentafluorophenyl)borate.

Suitable oxidizing cations include organic and inorganic cations having sufficient electronegativity to oxidize the metal derivatives. Organic oxidizing cations for use in the compounds corresponding to formula (II) include ferrocenium ions, indenium ions and cationic derivatives of substituted ferrocene, indene, and the like molecules. Suitable metallic oxidizing cations include $Ag^{+1}$, $Pd^{+2}$, $Pt^{+2}$, $Hg^{+2}$, $Hg_2^{+2}$, $Au^+$ and $Cu^+$. The process of the invention involves a molecular oxidation. The Group 3, 4, 5, 6, 8, 9, 10 or Lanthanide metal is previously fully oxidized. Highly preferred oxidizing cations have an oxidation potential of at least +0.20 volt and preferably at least +0.25 volt. Most highly preferred oxidizing cations are ferrocenium and $Ag^{+1}$ cations.

Without wishing to be bound by any particular theory of operation it is believed that the oxidizing cation causes the molecular oxidation of the metal derivative, and in the process becomes a neutral species. The oxidized metal derivative loses a hydrogen or organyl radical (·R) by a unimolecular elimination reaction. Two or more such radicals form a hydrogen molecule or a neutral organic species of the formula $R(R_x)$ where x is an integer. These byproducts are neutral or noninterfering with any subsequent polymerization reaction and may also be removed from the reaction mixture. The preparation technique is analogous to that previously disclosed by R. Jordan, et al., J. A. C. S., 109, 4111–4113 (1987).

Illustrative, but not limiting, examples of oxidizing agents according to formula (II) are ferrocenium tetra(-pentafluorophenyl)borate, gold (I) tetrakis 3,4,5-trifluorophenyl borate, silver tetra(pentafluorophenyl)borate, 1,1'-dimethylferrocenium tetrakis 3,5-bistrifluoromethylphenyl borate and the like.

Returning to above formula (I), preferably A− corresponds to the formula:

$$[M'Q_{n'}]^-$$

wherein:
M' is a metal or metalloid selected from Groups 5–15 of the Periodic Table of the Elements;
each Q independently is hydride, dialkylamido, halide, alkoxide, aryloxide, hydrocarbyl, or substituted hydrocarbyl containing up to 20 carbon atoms with the proviso that in not more than one occurrence is Q halide;
n' is an integer from 2 to 8; and
n−m=1;

Second components comprising boron are particularly useful in the preparation of catalysts of formula (I) and may be represented by the following general formula:

$$[L-H]^+ [BQ_4]^-$$

wherein:
L is a neutral Lewis base;
[L—H]+ is a Bronsted acid;
B is boron in a valence state of 3; and
Q is as previously defined.

Illustrative, but not limiting, examples of boron compounds which may be used as a second component in formula (I) are trialkyl-substituted ammonium salts such as triethylammonium tetraphenylborate, tripropylammonium tetraphenylborate, tri(n-butyl)ammonium tetraphenylborate, trimethylammonium tetra(p-tolylborate), tributylammonium tetrakis-pentafluorophenylborate, tripropylammonium tetrakis-2,4-dimethylphenylborate, tributylammonium tetrakis-3,5-dimethylphenylborate, triethylammonium tetrakis-(3,5-ditrifluoromethylphenyl)borate and the like. Also suitable are N,N-dialkyl anilinium salts such as N,N-dimethylanilinium tetraphenylborate, N,N-diethylanilinium tetraphenylborate, N,N-2,4,6-pentamethylanilinium tetraphenylborate and the like; dialkyl ammonium salts such as di-(i-propyl)ammonium tetrakispentafluorophenylborate, dicyclohexylammonium tetraphenylborate and the like; and triaryl phosphonium salts such as triphenylphosphonium tetraphenylborate, tri(methylphenyl)phosphonium tetrakis-pentafluorophenylborate, tri(dimethylphenyl)phosphonium tetraphenylborate and the like.

Similar lists of suitable compounds containing other metals and metalloids which are useful as second components could be made, but such lists are not deemed necessary to a complete disclosure. In this regard, it should be noted that the foregoing list is not intended to be exhaustive and other boron compounds that would be useful as well as useful components containing other metals or metalloids would be readily apparent from the foregoing general formula and examples to those skilled in the art.

In a highly preferred embodiment of the present invention $C_p$ is pentamethylcyclopentadiene, m is zero or one, M is titanium or zirconium, n is two or three, p is zero, X is R or OR, and A is tetrakis-pentafluorophenyl borate. In a most preferred embodiment X is $C_{1-20}$ alkyl, aryl, aralkyl, phenoxy or alkoxy and m is 0 or 1.

In general, the metal complex can be prepared by combining the two components in a suitable solvent at a temperature of from $-100°$ C. to $300°$ C. Suitable solvents include straight and branched-chain hydrocarbons such as $C_{6-12}$ alkanes (hexane, heptane, octane and the like); $C_{6-12}$ cyclic and alicyclic hydrocarbons such as cyclohexane, cycloheptane, methylcyclohexane, methylcycloheptane and the like and $C_{6-12}$ aromatic and alkyl-substituted aromatic compounds such as benzene, toluene, xylene, decalin, and the like, and mixtures thereof. The catalysts' components are generally sensitive to both moisture and oxygen and should be handled and transferred in an inert atmosphere such as nitrogen, argon or helium.

Preferred metal hydrocarbyls are those having from 1 to 10, more preferably from 1 to 4 carbons in the hydrocarbyl group, especially aluminum, magnesium and zinc hydrocarbyls. Most preferred are aluminum trialkyls, especially triisobutyl aluminum. The amount of metal hydrocarbyl preferably is sufficient to provide a molar ratio of metal complex:metal hydrocarbyl from 1:1 to 1:100, most preferably from 1:5 to 1:75.

The components of the metal complex compound and the metal hydrocarbyl may be combined in any order. Preferably, however, the metal complex compound components are first contacted and allowed to form the desired complex and thereafter the metal hydrocarbyl is added thereto. Suitably a solution of the metal hydrocarbyl in an inert hydrocarbon such as toluene is employed. The compounds are preferably combined at temperatures from $0°$ C. to $160°$ C., most preferably from $25°$ C. to $100°$ C. An inert atmosphere is employed as previously explained.

Suitable vinyl aromatic monomers which can be polymerized using the catalyst compositions of the present invention include those represented by the formula:

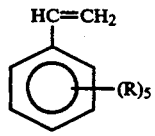

wherein each R is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butyl styrene, p-vinyl toluene etc. with styrene being especially suitable. Copolymers of styrene and the above vinyl aromatic monomers other than styrene can also be prepared.

The polymerization may be conducted under slurry, bulk or suspension polymerization conditions or other suitable reaction conditions including solid, powdered reaction conditions. The polymerization can be conducted at temperatures of from $0°$ C. to $160°$ C., preferably from $25°$ C. to $100°$ C., more preferably from $30°$ C. to $80°$ C., for a time sufficient to produce the desired polymer. The catalyst composition may be employed homogeneously or supported on the surface of a suitable support. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (100 kPa–3,400 kPa). The use of ambient or low pressures, e.g., 1–5 psig (100–130 kPa) is preferred in view of lower capital and equipment costs.

The polymerization may be conducted in the presence of an inert diluent or solvent or in the absence thereof, i.e., in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E ®, available from Exxon Chemical Company. Suitable amounts of solvent are employed to provide a monomer concentration from 5 percent to 100 percent by weight.

The molar ratio of the vinyl aromatic monomer to the catalyst composition (in terms of metal) may range from 100:1 to 5,000,000:1, preferably from 3,500:1 to 500,000:1. In the case of using a solvent, the catalyst may be used at a concentration with the range from $10^{-7}$ to $10^{-1}$ moles per liter of solvent.

As in other similar polymerizations it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, etc. may be employed. Additional quantities of a metal hydrocarbyl may be included in the reaction mixture if desired without departing from the scope of the present invention, it only being necessary that some of the metal hydrocarbyl be contacted with the metal complex prior to contact with the vinyl aromatic monomer.

Purification of the resulting polymer to remove entrained catalyst composition may also be desired by the practitioner. Purification of the resulting polymer prepared by the process of this invention is much easier than a conventional process since the process of this invention does not use polyalkylaluminoxane which is used in large quantities as cocatalyst in the conventional process. Entrained catalyst composition may generally be identified by residues of ash on pyrolysis of the polymer that are attributable to catalyst composition metal values. A suitable technique for removing such compounds is by solvent extraction, e.g., extraction utilizing hot, high boiling chlorinated solvents, acids or bases such as caustic followed by filtration.

Having described the invention, the following examples are provided as further illustrative and are not to be construed as limiting. Unless stated to the contrary, all parts and percentages are based on weight.

EXAMPLE 1

In a argon atmosphere dry box a 0.0024M solution/suspension of the catalyst composition was prepared. A dry 2 ml volumetric flask was charged with 0.70 ml of a 0.0069M (4.8 μmol) solution of pentamethylcyclopentadienyltribenzyl titanium in toluene, 4.8 mg (4.8 μmol) of decamethylferricinium tetra(pentafluorophenyl) boron and 26.5 μl of a 1M toluene solution of triisobutyl aluminum (TIBA, 26.5 μmol), then filled to the mark with dry, degassed toluene. The mixture was allowed to interact while being stirred for 1.5 hours, after which time a dark solution/suspension had formed.

Polymerization-1

A dry 20 ml vial was charged with 10 ml (87.4 mmole) of purified styrene, 20 μl of a 1M toluene solution of TIBA, capped with a Teflon TM coated septa and a metal crimp cap, removed from the argon atmosphere dry box and then placed in a 70° C. water bath. After 10 minutes 250 μl of the above catalyst was added. Total TIBA present was 23.5 μmole. The molar ratio of styrene:Ti:TIBA was 145,000:1:39. After 1 hour the vial was removed from the water bath and the polymerization stopped by the addition of 2 ml of methanol. The off white, insoluble polymer was dried in-vacuo to give 22.4 percent yield of a resultant polymer. The resultant polymer was insoluble in methylene chloride, methylethylketone and other common solvents for atactic polystyrene. The resultant polymer had a crystalline melting point of 270° C., consistent with a polymer having >98 percent syndiotacticity.

EXAMPLE 2

In an argon atmosphere dry box a 0.01M solution/suspension of the catalyst composition was prepared. A dry 2 ml volumetric flask was charged with 0.70 ml of a 0.0069M (4.8 μmol) solution of pentamethylcyclopentadienyltribenzyl titanium in toluene, 4.8 mg (4.8 μmol) of decamethylferricinium tetra(pentafluorophenyl) boron and 100 μl of a 1M toluene solution of TIBA (100 μmole), then filled to the mark with dry, degassed toluene. The mixture was allowed to interact while being stirred for 1.5 hours, after which time a dark solution/suspension had formed.

Polymerization-2

A dry 20 ml vial was charged with 10 ml (87.4 mmol) of purified styrene, 20 μl of a 1M toluene solution of TIBA, capped with a Teflon TM coated septa and a metal crimp cap, removed from the argon atmosphere dry box and then placed in a 70° C. water bath. After 10 minutes 250 μl of the above catalyst was added. Total TIBA present was 32.5 μmole giving a molar ratio styrene:Ti:TIBA of 145,000:1:54. After 1 hour the vial was removed from the water bath and the polymerization stopped by the addition of 2 ml of methanol. The off white, insoluble polymer was dried in-vacuo to give 30.4 percent yield of a resultant polymer. The resultant polymer was insoluble in methylene chloride, methylethylketone and other common solvents for atactic polystyrene. The resultant polymer had a crystalline melting point of 270° C., consistent with a polymer having >98 percent syndiotacticity.

Comparative

In an argon atmosphere dry box a 0.01M solution/suspension of the catalyst composition was prepared. A dry 2 ml volumetric flask was charged with 0.70 ml of a 0.0069M (4.8 μmol) solution of pentamethylcyclopentadienyltribenzyl titanium in toluene, 4.8 mg (4.8 μmol) of decamethylferricinium tetra(pentafluorophenyl) boron and then filled to the mark with dry, degassed toluene. The mixture was allowed to interact while being stirred for 1.5 hours after which time a dark solution/suspension had formed.

Polymerization-3

A dry 20 ml vial was charged with 10 ml (87.4 mmole) of purified styrene, 20 μl of a 1M toluene solution of TIBA, capped with a Teflon TM coated septa and a metal crimp cap, removed from the argon atmosphere dry box and then placed in a 70° C. water bath. After 10 minutes 250 μl of the above catalyst was added. Total TIBA present was 20 μmole. The molar ratio of styrene:Ti:TIBA was 145,000:1:33. After 1 hour the vial was removed from the water bath and the polymerization stopped by the addition of 2 ml of methanol. The off white, insoluble polymer was dried in-vacuo to give 9.4 percent yield of a resultant polymer. The resultant polymer was insoluble in methylene chloride, methylethylketone and other common solvents for atactic polystyrene. The resultant polymer had a crystalline melting point of 270° C., consistent with a polymer having >98 percent syndiotacticity.

Polymerization-4

The reaction conditions of Polymerization −3 were substantially repeated excepting that 40 μl of a 1M toluene solution of TIBA was added to the styrene monomer before contacting with the catalyst. The molar ratio of styrene:Ti:TIBA was 145,000:1:67. After 1 hour the vial was removed from the water bath and the polymerization stopped by the addition of 2 ml of methanol. The off white, insoluble polymer was dried in-vacuo to give 10.3 percent yield of a resultant polymer. The resultant polymer was insoluble in methylene chloride, methylethylketone and other common solvents for atactic polystyrene. The resultant polymer had a crystalline melting point of 269° C., consistent with a polymer having >98 percent syndiotacticity.

As may be seen by the above examples and the comparative experiments a significant improvement in polymerization rate is obtained when the metal complex composition is first prepared and utilized to polymerize styrene rather than preparing the complex and contacting the same with styrene contemporaneously with the metal alkyl.

I claim:

1. A catalyst composition for preparing polymers of vinyl aromatic monomers having high stereo-regularity comprising:

1) a metal complex of the formula:

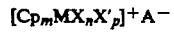

$$[Cp_mMX_nX'_p]^+A^-$$

wherein:
Cp is a single $\eta^5$-cyclopentadienyl group or a $\eta^5$-substituted cyclopentadienyl group;
M is a metal of Group 3, 4, 5, 6, 8, 9, 10 or the Lanthanide Series of the Periodic Table;

each X independently is an inert anionic ligand or a group of formula R, with the proviso that at least one X is R;

X' is an inert, neutral donor ligand;

each R independently is R' or hydride, wherein R' is hydrocarbyl, silyl or a mixture thereof, optionally substituted with one or more halogen atoms or alkoxy groups, said R' having up to 20 carbon and/or silicon atoms;

m and p are independently 0 or 1;

n is an integer greater than or equal to 1; and the sum of m and n is one less than the valence of M; and A— is a noncoordinating, compatible anion of a Bronsted acid salt; and 2) an aluminum, magnesium or zinc metal hydrocarbyl, the molar ratio of the metal complex: metal hydrocarbyl being 1:1 to 1:1000;

said metal complex and metal hydrocarbyl being combined prior to contacting of the metal complex with a vinyl aromatic monomer.

2. A catalyst composition according to claim 1 wherein the metal hydrocarbyl is a trialkyl aluminum.

3. A catalyst composition according to claim 2 wherein the trialkyl aluminum is triisobutyl aluminum.

4. A catalyst composition according to claim 1 wherein the molar ratio of metal complex to metal hydrocarbyl is from 1:1 to 1:100.

5. A catalyst composition according to claim 1 wherein M is titanium or zirconium.

6. A catalyst composition according to claim 1 comprising pentamethylcyclopentadienyltribenzyltitanium tetra(pentafluorophenyl)borate and triisobutyl aluminum.

* * * * *